United States Patent [19]

Swenson

[11] 4,312,513
[45] Jan. 26, 1982

[54] GEAR HOLDING HYDRAULICALLY ACTUATED CHUCK

[75] Inventor: Henry F. Swenson, Roseland, N.J.

[73] Assignee: J & S Tool Company, Livingston, N.J.

[21] Appl. No.: 65,640

[22] Filed: Aug. 10, 1979

[51] Int. Cl.³ ............................................. B23B 31/20
[52] U.S. Cl. .................................. 279/1 G; 279/1 S; 279/4; 29/434
[58] Field of Search ................. 279/4, 1 G, 1 S, 1 D, 279/106; 29/434

[56] References Cited

U.S. PATENT DOCUMENTS

| | | | |
|---|---|---|---|
| 2,383,094 | 8/1945 | Walder | 279/4 |
| 2,933,320 | 4/1960 | Lyons | 279/1 G |
| 3,099,457 | 7/1963 | Hohwart et al. | 279/106 |
| 3,104,886 | 9/1963 | Hohwart et al. | 279/106 |
| 3,190,664 | 6/1965 | Hohwart et al. | 279/1 D |
| 3,344,695 | 10/1967 | Hohwart | 279/1 D |
| 3,479,042 | 11/1969 | Hohwart | 279/1 D |
| 3,685,844 | 8/1972 | Sykes | 279/4 |
| 3,692,320 | 9/1972 | Lindelof et al. | 279/4 |
| 3,954,275 | 5/1976 | Pickles | 279/4 |
| 4,032,162 | 6/1977 | Flinchbaugh | 279/4 |
| 4,116,453 | 9/1978 | Andre | 279/4 |

Primary Examiner—Daniel C. Crane
Attorney, Agent, or Firm—Ralph R. Roberts

[57] ABSTRACT

This application discloses a work-holding chuck particularly for gears with their exterior teeth finished or substantially finished as by grinding, shaving and the like. This chuck has a plurality of hardened and finished pins which are moved and secured in a precise circular array and arranged as pairs on a ring member. A stop is provided so that the gear and the hub portion thereof is precisely located and positioned. Sliding segments are moved along a ramp guide by pneumatic or hydraulic means to bring the formed pins into the formed flanks of the teeth profile to repeatedly and precisely hold the gear by its formed and finished teeth. The held gear is now finished in its bore. Means are provided for readily changing the pins and position of these pins on the chuck so that gears of different pitch, number of teeth and/or lead may be accommodated.

22 Claims, 5 Drawing Figures

GEAR HOLDING HYDRAULICALLY ACTUATED CHUCK

BACKGROUND OF THE INVENTION

DESCRIPTION OF THE PRIOR ART

The use of quick acting chucks is well known and in particular the use of pneumatic or hydraulic power to move the gripping members into place is conventional. There are many patents for such chucks issued in the United States Patent Office and also by foreign countries. The present invention is directed toward the precise gripping and positioning of gears which have been ground or shaved to establish a precise outer tooth configuration. These gears have their teeth formed to present a finished outer profile but the bore of this gear must now be precisely formed and this is usually accomplished by grinding since the outer surface of the gear has been heat treated to make the teeth, at least on their tooth surface, more durable.

Among those patents that are representative of the prior art are U.S. Pat. No. 4,116,453 to ANDRE as issued on Sept. 26, 1978 which shows a chuck which grips the work piece on the outer diameter. This chuck in its gripping actuation employs a pressurized air or fluid to move a piston and associated ramp components. Another patent of interest is U.S. Pat. No. 2,890,005 to GARRISON as issued on June 9, 1959. This patent has a split collet held by ramp members actuated by a hydraulic piston. The N. A. Woodworth Company of Detroit, Mich. is also very active in the chuck field and among the patents assigned to this company which are considered pertinent are U.S. Pat. No. 3,099,457 as issued to HOHWART et al. July 30, 1963; U.S. Pat. No. 3,104,886 as issued to HOHWART et al. on Sept. 24, 1963; U.S. Pat. No. 3,190,664 as issued to HOHWART et al. on June 22, 1965 and U.S. Pat. No. 3,344,695 as issued to HOHWART on Oct. 3, 1967.

In the present invention the several embodiments do not show nor suggest a chuck particularly for gears having their outer teeth profiles finished. This chuck uses the finished tooth contours into which precisely finished tapered pins are moved to secure this gear in a precise position and location. A stop is provided for the hub of the gear so that it is axially stopped in its attitude. The pins are arranged in pairs and are adjustably fixed in a selected position to accommodate helical, spur and spiral arranged gears. The teeth entering pins are moved inwardly by a hydraulically or pneumatically actuated ramp.

SUMMARY OF THE INVENTION

This invention may be summarized at least in part with reference to its objects.

It is an object of this invention to provide, and it does provide, a pneumatically or hydraulically actuated chuck which is adjusted to accept a given gear on its outer teeth profile by a plurality of precise pin pairs and when these pins are moved inwardly by a ramp collar member these pins grip the gear on and by its precisely formed teeth.

It is a further object of this invention to provide, and it does provide, a gear chuck which has a plurality of front and rear circumferential gear holding pins which are selectively positioned to engage the teeth of the gear to be held.

It is a further object of this invention to provide, and it does provide, gear teeth engaging pins which are first precisely positioned and then are moved into a gripping position by a hydraulically actuated ramp. The pin pairs are adaptable for considerable adjustment on the ramp ring. The pin pairs are moved in a precise manner so that an equal gripping force is applied and so that localized gripping forces can be or are applied.

In brief, the chuck of this invention provides an outer housing that is fixed and non-rotating. A pair of anti-friction bearings such as tapered roller bearings carry the inner portion of this chuck. This chuck is disposed only for gears and for holding such gears by their finished teeth profiles. Hardened pins arranged as pairs and in at least groups of three are precisely positioned to grasp the gear on and by its teeth so as to present the bore of the gear for a final finish operation. This chuck has a piston which is movable by pneumatic or hydraulic means to move each pair of pins to and from a desired gripping condition. A tapered collet is moved inwardly to a gripping condition by a tapered ring body moved by the pistons and associated pins. Each pin for the teeth grip is adjusted as to its inner gripping position by a precise adjusting wedge member. This novel chuck permits like gears to be gripped by and on their teeth for a precise positioning of the gear and further finishing of the bore. Such finishing of the bore is usually required after finishing of the teeth of a gear which has been heat treated on and in its tooth area.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of a gear gripping chuck as adopted for use in finishing the bore of gears. This specific embodiment has been chosen for the purpose of illustration and description as shown in the accompanying two sheets of drawings wherein:

DETAILED DESCRIPTION OF THE GEAR CHUCK

Figure 1:
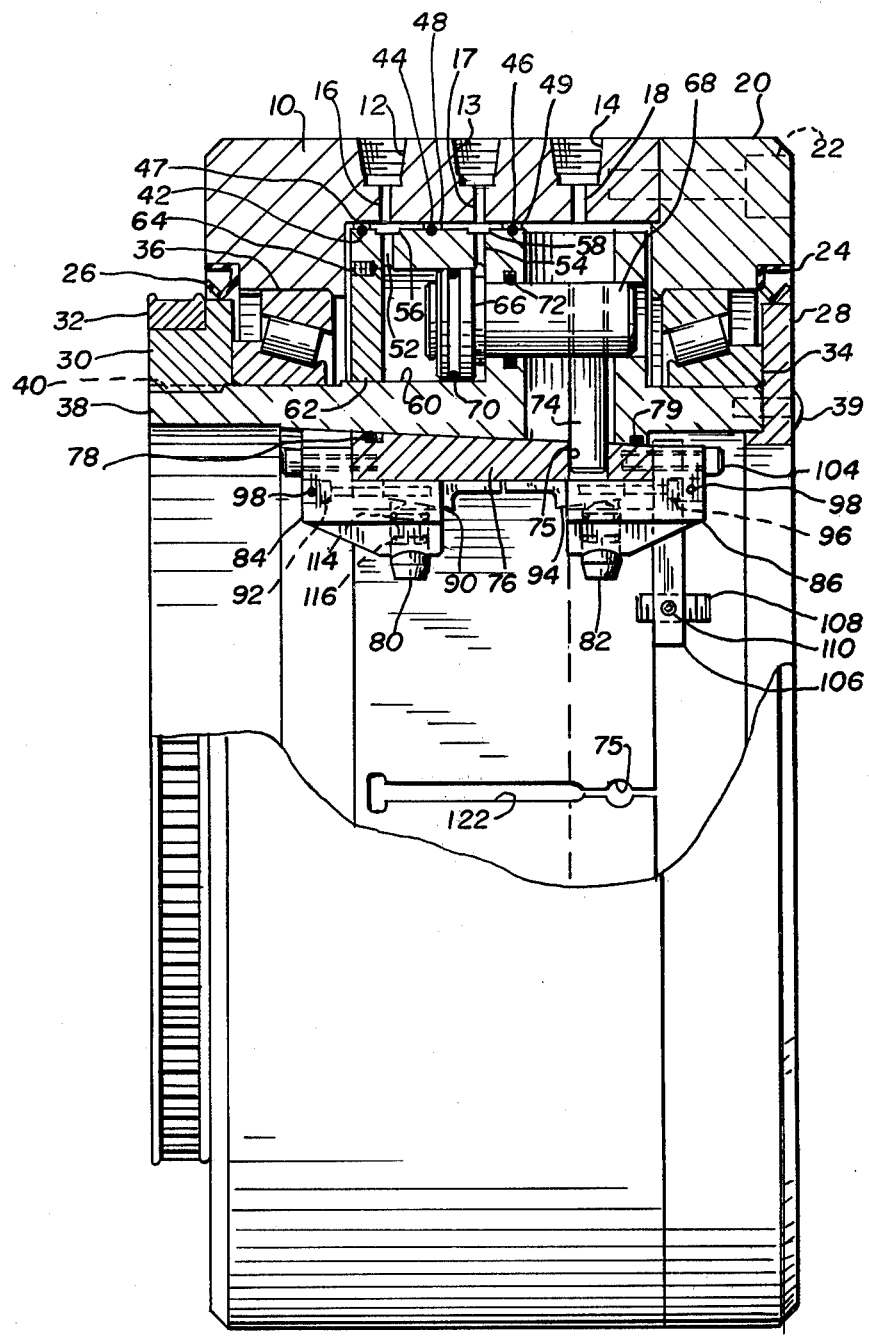
FIG. 1 represents a sectional view, partly diagrammatic, and showing a typical cross section of the gear chuck and showing the construction whereby the inner portion is made to be freely rotatable and the outer member is clamped or fixed to other apparatus not shown.
Figure 4:
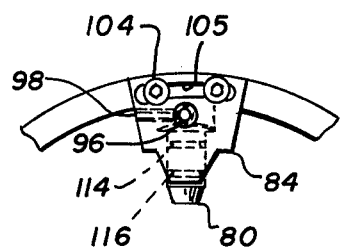
FIG. 4 represents an end view of a typical pin construction for mounting on a ring segment.

Referring next to the two sheets of drawings and in particular to FIG. 1, there is depicted partly in section a fixed outer housing 10. This housing is provided with inlets 12, 13 and 14 which terminate with conductors 16, 17 and 18. An end member 20 is shouldered to provide a precise fit with and retain fixed outer housing 10. There is provided a series of cap screws 22 which pass through holes and into threaded holes in fixed outer housing 10 whereby end member 20 is secured in place on the fixed outer housing 10. Grease shields 24 and 26 are fitted into precise recesses and engage rotating end members 28 and 30. End member 30 also is adapted to carry a timing belt pulley 32 by which the inner portion of the chuck is rotated at a desired speed by a motor means not shown. Like tapered roller bearings 34 and 36 are arranged so that a rotatable body 38 may be moved therein. End member 28 is secured to the rotatable body by screws 39. The timing belt pulley 32 is secured to the rotatable body 38 as by screws, not shown, epoxy cement or any other conventional means. Each member 28 is secured in place after tapered roller bearing 34 has been placed in position. Tapered roller bearing 36 is now placed in position. A thread 40 formed on rotatable body 38 and a mating thread formed on the end member 30 is used to tighten the end member 30 into position. The thread 40 allows the bearings 34 and 36 to be tightened in place as desired. O-rings 42, 44 and 46 are circumferentially carried by grooves formed in rotatable body 38 and where and when desired may also be used with teflon shield rings 47, 48 and 49 to reduce friction in the rotation of the body 38 within the cavity formed in the fixed outer housing 10.

Conduit 52 and 54 extend inwardly from circumferential rings or channels 56 and 58 formed in rotatable body 38. These conduits 52 and 54 lead to a piston cavity 60. There are three cavities formed in the rotatable body 38. A plug member 62 is pressed within and closes the bore of the piston cavity 60 and this plug is retained by a Dutchman or screw 64 so as to close the end of the piston cavity 60. Slidable in each of these cavities is the enlarged end of a piston 66 having a shank 68. This piston is movable leftwardly when pressurized air is fed to inlet 13 and rightwardly to its gripping position as seen when pressurized air is fed through inlet 12. An O-ring 70 is carried by the enlarged head end of piston 66. A groove in this head is formed to carry this O-ring. An O-ring 72 is carried in and by a groove formed in rotatable body 38.

Carried by the shank 68 of the piston 66 is an actuating pin 74 which engages and seats in a hole 75 in ramp ring or collet 76. As presently contemplated, there are three actuating pins 74 which engage complementary holes 75 formed in collet 76. Ring-like felt dust shields 78 and 79 are provided so that dirt does not enter the inner portion of the chuck. The inlets 12 and 13 are used when pressurized air is used to move pistons 66. It is often desirable to provide a small amount of lubrication to these pistons. Oil mist may be fed through inlet 14 or through the other inlets 12 and 13 as desired. The piston 66 is moved leftwardly when pressurized air is fed into conductor 17. During gripping of the gear, the piston 66 is shown in the rightward position with pins 80 and 82 slidably carried by like segments 84 and 86. These pins are moved in and out when the collet 76 is moved by the piston 66.

Figure 5:
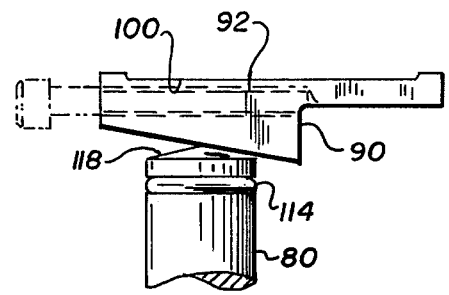
FIG. 5 represents a side view, partly diagrammatic, and showing the construction of an adjusting wedge for moving the teeth engaging pins inwardly or outwardly in relation to the tapered collet.

In FIG. 5 there is shown a typical pin 80 as carried in segment 84. Each pin has its inner end movable in or out by an adjusting wedge 90. This adjusting wedge is moved by a screw 92 and in a like manner an adjusting wedge 94 is moved by a screw 96 to bring the gear engaging pins to the desired grip position. Lock screws 98 retain each adjusting wedge in its adjusted position. In the enlarged view of FIG. 5 it is to be noted that the adjusting wedge has a reduced center portion 100 which allows the wedge to accommodate a small collasping force and to accept a very slight dislocation when the chuck is actuated. The collet member 76 has each face drilled and tapped with holes 102 in an arranged grouped array. As depicted, there are three groups of tapped holes 102 on each face of collet 76 to accommodate three segments 84 and 86 disposed and carried by the collet. Cap screws 104 are arranged as pairs and enter the tapped holes 102 to secure a particular segment to the collet face. A slot 105 is provided in each segment to allow and permit a shift in the positioning of the segment to be mounted and secured to the collet 76. A stop arm 106 carries a threaded stop member 108 which is locked in place by a screw 110. This threaded stop member 108 is adjusted so as to engage the hub face or other stop surface of a gear. This stop arm 106 as depicted is carried by a screw 112 which enters into a threaded hole 102 (FIGS. 2 and 3) in collet 76 and is carried so that this stop arm as an assembly is rotated with the retained gear.

USE AND OPERATION

In operation it is to be noted that the fixed outer housing 10 is secured to the end member 20 by means of cap screws 22. Preferably the end member 20 has mounting means for securing this outer housing of the chuck in a non-rotating, fixed position. The timing belt pulley 32 is driven by a timing belt and an exterior motor, not shown, to rotate the inner portion of this chuck at a desired speed. Tapered roller bearings 34 and 36 insure that a desired rotating accuracy is achieved and a support of the inner portion of the chuck is maintained. End member 28 is drawn into place by means of end member 30 which is screwed to the inner rotatable body 38 to tighten the tapered roller bearings. The piston 66 is moved to the right by means of air entering the conductor 16 and travelling through conductor 16 and 52 to the piston cavity 60. It is contemplated that the chuck has at least three pistons 66 carried in formed cavities in the rotatable body 38. When it is desired to loosen the chuck and move the teeth gripping pins outwardly to a non-gripping condition the pistons 66 are moved to the left by air entering conductor 17 and then into conduit 54 to move the piston 66 to the left.

It is to be noted that teeth gripping pins 80 and 82 are retained by means of O-rings 114 and 116 in segments 84 and 86. These O-rings prevent unwanted movement or looseness of the teeth gripping pins in the bores in segments 84 and 86. These pins are precisely positioned in relation to the collet member 76 by means of cap screws 104 which allow the segments 84 and 86 to be precisely moved and tightened in place. In and out movement of each pin in relation to its holder is achieved by moving an adjusting wedge 90 or 94 by means of a screw 96. These screws move the adjusting wedge forwardly and rearwardly and the slope of the adjusting wedge engages the tapered and conical surface 118 formed on the end of the pins 80 and 82 to move the pins to the desired condition.

In use it is anticipated that the chuck will be positioned and mounted in a fixed orientation for driving by the timing belt pulley 32. Pins 80 and 82 enter the teeth of the gear and grip said gear while it is rotated and the bore thereof is finished. When pins 80 and 82 are in the desired orientation the cap screws 104 are tightened into position and the pins 80 and 82 are rotated in position in slots 105. As seen in the enlarged view, screw 92 is turned to cause the adjusting wedge 90 and 94 to be moved to cause pins 80 and 82 to move forwardly or rearwardly and thus in and out. The loosening of the gear is anticipated to be made when the piston 66 is moved rightwardly by means of air or hydraulic fluid entering the conduit 16 and 52 to move the piston and the actuating pin 74 to the right.

The loosening of the teeth engaging pins of the gear chuck is achieved by the movement of the pistons 66 leftwardly. This movement of the pistons causes the collet 76 to release slightly, allowing the gripped gear to be removed from the chuck. Another like gear is then inserted into the chuck and positioned on the teeth gripping pins.

The face of the hub of the gear is brought to and against a threaded stop member 108 whereupon pressurized air or hydraulic force is applied to the pistons 66 to cause them to be moved to the right, as shown. The newly positioned gear is now gripped by its teeth.

A pushing of the rear of the pistons 66, for a loosening of the pins, is achieved through air or hydraulic force being fed through conductor 17. Teeth engaging pins 80 and 82 are depicted and arranged as units or groups of three and thus repeatedly grip and retain gears of like configuration and profile. When it is desired to mount and finish gears having a different tooth profile, a different number of teeth or other conditions, the chuck is repositioned as to its teeth engaging pins. Screws 104 are loosened and the segments 84 and 86 are repositioned and in the manner above described the gear and chuck are again made to precisely hold a gear by its teeth for finishing its bore. After re-establishing the chuck, the gripping pins 80 and 82 are actuated by the pistons 66 to move the collet 76 to a gripping or loosening position.

It is to be noted that the timing belt pulley 32 as depicted is a preferable means of driving the chuck and that alternate means, such as sprocket and roller chain, may be provided. Also contemplated is a hydraulic, pneumatic or electric motor with or without a gear reducer incorporated therein. It is desired that the rotatable body 38 is revolved at a selected speed and as smoothly as possible. Preferably, the tapered roller bearings 34 and 36, by means of screw threads 40, are adjusted into a desired condition. These tapered roller bearings may, of course, be replaced by ball bearings or needle bearings since the bearing means is only a matter of preference. It is also contemplated that air bearings may be used.

Figure 2:
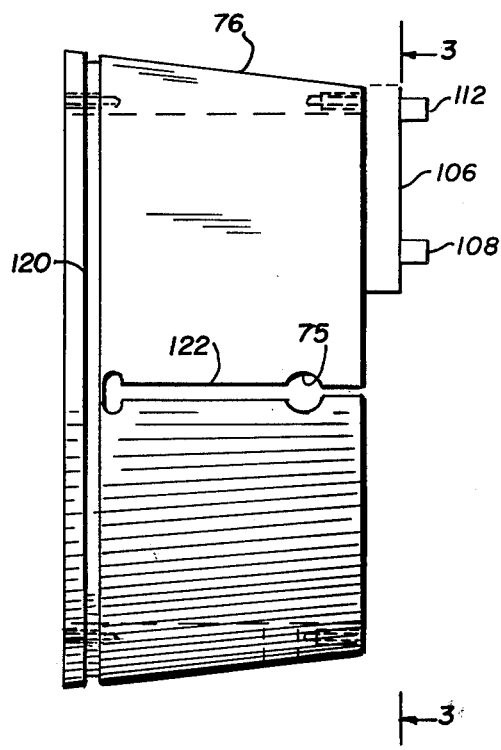
FIG. 2 shows a typical construction of the tapered ramp or collet segment.

The pistons 66 are preferably three or more in number and an actuating pin 74 with each piston is adapted to slidably engage a hole 75 in the collet 76. As shown in FIG. 2 there is a groove 120 adapted to carry the felt dust shield 78 as seen in FIG. 1. With the movement of the piston 66 the felt dust shield 78, secured in this groove 120, moves with the collet 76. A groove in the rotatable body 38 carries felt dust shield 79 in a fixed condition or position. These felt dust shields 78 and 79 are disposed so that when the collet 76 is moved to the left or right by pistons 66, dirt, dust or like debris does not enter the facing conical surfaces between rotatable body 38 and the collet 76. Slots 122, as seen in FIGS. 1 and 2, as formed in the collet member 76 allow the collet to be slightly collasped from its formed condition.

Figure 3:
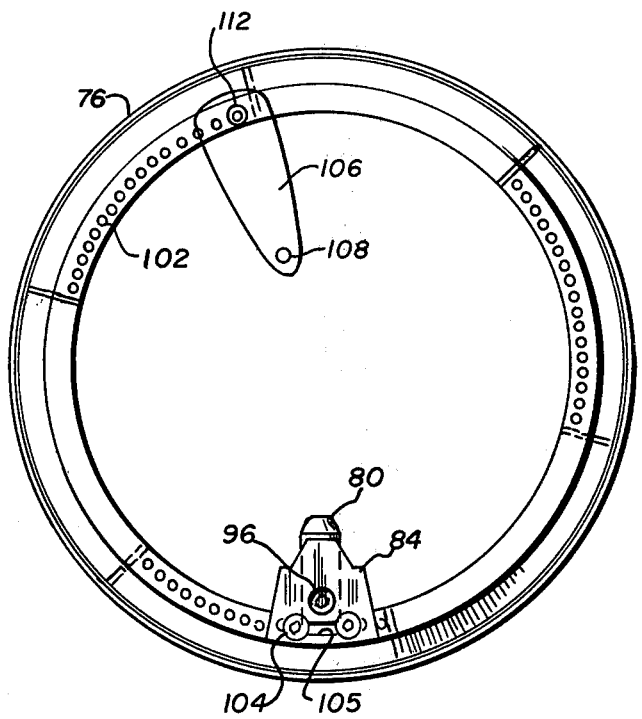
FIG. 3 shows a typical use of the tapered collet segment of FIG. 2 and showing in particular the jaw clamp as secured for positioning on a segment and in position so that the teeth engaging pins are precisely positioned in relation to the orienting pins as moved by hydraulic pistons, this view taken on the line 3—3 of FIG. 2 and looking in the direction of the arrows.

The collet is made so it does not fall apart but the several slots 122 in the collet allow it to be moved inwardly for a few thousandths of an inch when the collet is moved by the pistons 66. This piston movement enables the collet to be collasped inwardly or expanded in accordance to the movement of the pistons 66 and the actuating pin 74. The slots 122 may be formed to extend from one side, or as depicted in FIG. 3, may extend from both sides to provide six sectional portions.

It is also to be noted that the threaded stop member 108, carried by the arm member 106, is secured to the end of the collet 76 by means of a cap screw similar to or identical to cap screw 104 as seen in FIG. 1. This stop is disposed to engage a shoulder portion of the gear to be engaged. This shoulder may be the hub of the gear or may be the rim end portion of the gear. Whatever portion of the gear is to be engaged, this stop is intended to repeatedly engage a finished surface. The arm 106 and the threaded stop member 108 are made to suit the gear to be finished. This stop is secured to the rotating collet 76 and may be positioned on the opposite face if loading of the gear is better served by this arrangement. While arm 106, as shown, utilizes only one cap screw 104 for mounting to an end of the collet 76 this does not preclude the securing of arm 106 by more than one cap screw 104. It is to be noted that when and as pressurized air or hydraulic fluid is used that O-rings 42, 44 and 46 are utilized to prevent pressurized fluid from conductors 16 from flowing to conductor 17. The inlet 14 is used for the use of oil mist which is merely a matter of preference and when used O-ring 46 is contemplated to provide the desired barrier between conduit 17 and 18. Because of friction drag of O-rings 42, 44 and 46 it is contemplated that Teflon (TM Dupont) shields 47, 48 and 49 may be used in conjunction with these O-rings to reduce the friction and to allow slippage to be established.

The teeth gripping taper on pins 80 and 82 is selected to accommodate the particular tooth profile formed on the gear and of course the size of the pins are made to accommodate the gear or gears being finished. A conical surface 118, formed on the end of pin 80 or 82, is merely a matter of preference but is anticipated to be approximately fifteen degrees to match the taper of the adjusting wedge 90 or 94 as shown in FIG. 5. The tapped holes 102, as seen in FIG. 3, are spaced and positioned in an arc to accommodate the segments 84 and 86. Slot 105 is disposed and sized so that the shanks of the cap screws 104 may pass through this slot while the segment is moved back and forth to the desired orientation as far as the location of the pin is concerned.

Carried by the shank 68 of piston 66 is an actuating pin 74 which engages and seats in a hole 75 in ramp ring or collet 76. As presently contemplated, there are three actuating pins 74 which engage complementary holes 75 formed in collet 76. Felt dust shields 78 and 79 are provided so that dirt does not enter into the inner portion of the chuck. The inlets 12 and 13 are used when pressurized air is used to move the enlarged ends of piston 66. It is often desirable to provide a small amount of lubrication to these pistons. Oil mist may be fed through inlet 14 or through the other inlets 12 and 13 as desired. The pistons 66 are shown moved to the rightward position with pins 80 and 82 slidably carried by like segments 84 and 86. These pins are moved in and out when the collet 76 is moved by the pistons 66.

It is to be noted that hole 75 is shown in the slot 122, but this is not required since the holes 75 may be positioned at any spacing and at any size to suit the pins 74. The pins 74, although preferably made of a drill rod for economical construction, may be made in other configurations. The pistons 66 need only be secured to an actuating means so as to move the collet 76 when and as the pistons 66 are moved. The pins 80 and 82 are shown as having no head but they may be made with a head if desired. The pins 80 and 82 are usually made of hardened and ground steel for durability, but these teeth holding pins may have special contours to suit the designer of the chuck and the intended use of the chuck. The chuck of this invention is specific in its application in that it mounts and holds like-shaped and ordered gears so as to retain these gears by and with their teeth profile and in a repetitive manner grip these gears so that their bore can be finished by conventional machine tool methods and equipment.

It is also to be noted that in FIG. 1 the piston 66 uses the conformation of the enlarged head end for its limitation in the travel of the piston in the bore. The pistons 66 are moved leftwardly when pressurized air is fed into conductor 17 and rightwardly when air is fed into conductor 16 during gripping of the gear. The left end of the piston head is formed with a reduced step so that the pressurized air or hydraulic fluid entering the cavity through conduit 56 flows against the head of each piston to move it to the right. A small shoulder at the rear of the enlarged head end permits pressurized air or hydraulic fluid to flow to the rear of the piston head through conduit 54 to urge and move the piston 66 to the left. O-ring 72 insures that the flow of pressurized air or hydraulic fluid through conduit 54 flows only to the rear of the piston head. Plug member 62 provides the leftward stop for the head of the piston 66. As a method the gear holding chuck provides for holding gears having their teeth profiles finished or substantially finished, this method including gripping like-formed and finished gears by and on their teeth profiles while the bore of this held gear is finished, said method steps including: providing a fixed outer housing and forming a plurality of hydraulic conductors leading from the exterior of the housing to an interior bore formed in said housing; rotatably mounting a body carried interior of the fixed outer housing and forming the interior portion of this body with a conical bore in axial alignment with the bore of the housing and carrying said body in and by bearing means disposed between the fixed outer housing and the rotatable body, said bearing means adapted to carry the rotatable body in a selected and determined orientation; sealing the bearing means to protect the bearing means from unwanted exterior contamination such as dirt, dust and the like; carrying a collet in and by the rotatable body and forming said collet with a tapered outer surface compatible with the conical bore formed in the rotatable body; arranging and mounting a plurality of segments as pairs interior of the collet and securing in a selected position said segments as pairs to the opposite ends of the collet and carrying a pin in each segment so as to be selectively movable in and out in response to the in and out movement of the collet; adjustably positioning each pin in the segment holder to precisely bring the pin to a desired gripping position in the tooth of a gear when and while the collet is at its inner limit; rotating the rotatable body and associated components and the gripped gear so as to finish the bore of the gear; arranging and positioning an adjustable stop so as to engage a gear at a selected shoulder so the gripped gear is positioned in the chuck at the same selected location, and carrying and moving a plurality of pistons in the rotating body by hydraulic means so as to move engaging means and the collet axially to cause inward and outward movement of the teeth gripping pins to established limits, this hydraulic fluid being fed through the conductors in the housing.

Terms such as "left", "right", "up", "down", "front", "back", "in", "out" and the like are applicable to the embodiment shown and described in conjuction with the drawings. These terms are merely for the purposes of description and do not necessarily apply to the position in which the gear holding chuck may be constructed or used.

While a particular embodiment of said chuck is shown and described it is to be understood the invention is not limited thereto since modifications as above suggested may be made within the scope of the accompanying claims and protection is sought to the broadest extent the prior art allows.

What is claimed is:

1. A hydraulically actuated holding chuck for gears having their teeth profiles finished or substantially finished, this chuck disposed to grip like-formed and finished gears by and on the teeth profile while the bore of the held gear is finished, said chuck including:
   (a) a fixed outer housing having a plurality of hydraulic conductors leading from the exterior of the housing to an interior bore in said housing;
   (b) a fixed end member removably secured to said fixed outer housing;
   (c) a rotatable body carried interior of the fixed outer housing, an interior portion of this body having a conical bore formed therein and thereon;
   (d) bearing means disposed between the outer housing and end member and rotatable body and adapted to rotatably carry the rotatable body in a determined orientation;
   (e) sealing means carried adjacent the bearing means to protect the bearings from the unwanted exterior contamination of the bearings by dirt, dust and/or chips;
   (f) a collet carried by the rotatable body and having a tapered outer surface compatible with the conical bore in the rotatable body, said collet being axially movable with respect to the rotatable body, axial movement of the collet within the conical bore of the body producing an in and out movement of the collet corresponding to the axial movement of the tapered outer surface of the collet in the conical bore of the rotatable body;
   (g) a plurality of segments arranged as pairs and carried by the collet;
   (h) means for securing in a selected position said segments as pairs to the opposite ends of the collet wherein said means for securing the segments in a selected position are a plurality of tapped holes arranged as accurate groups in each end of the collet;
   (i) a pin carried in each segment and selectively movable in response to the in and out movement of the collet;
   (j) means for adjustably positioning each pin in its segment holder to precisely bring the pin to a desired gripping position in the tooth of a gear when the collet is at its inner limit;
   (k) means for rotating the rotatable body and associated components and the gripped gear for machine finishing the bore of the gear;

(l) adjustable stop means for engaging the gear at a stop shoulder so that the position of a gear in the chuck is the same with each gripped gear wherein said adjustable stop means for engaging the gear is an arm carried by the collet and fastened in one of said tapped holes and having a threaded portion adjustably moved in said arm to bring an end of said screw into a determined stop condition, and (m) a plurality of pistons carried in the rotating body and disposed to move engaging means by which the tapered collet is moved axially to eastablished limits to cause the collet to be drawn inwardly and outwardly in response to the movement of the pistons, said pistons being moved by hydraulic fluid fed through said conduits in the outer housing.

2. A gear holding chuck as in claim 1 in which the means for rotation of the body, collet, segments, pins and held gear is by a timing belt pulley driven by a timing belt and a motive means.

3. A gear holding chuck as in claim 1 in which the bearing means for retaining the body in the housing is a pair of antifriction bearings disposed in recesses formed in the outer housing and end member.

4. A gear holding chuck as in claim 3 in which the antifriction bearings are a pair of oppositely disposed tapered roller bearings carried in recesses formed in the outer housing and end member and the sealing means includes grease shields carried in formed outer recesses.

5. A gear holding chuck as in claim 4 in which there is provided screw threads cooperatively formed on the rotatable body and an end member, the adjusting of these threaded members providing the desired tightening of the tapered bearings.

6. A gear holding chuck as in claim 1 in which the collet carried by the rotatable body is made of tempered steel to provide a ring-like member having a plurality of slots extending inwardly from the sides thereof, said collet having a spring quality so as to return to its desired condition.

7. A gear holding chuck as in claim 6 in which the slots in the collet are formed so as to extend alternately inwardly from one end to an opposite end of the collet.

8. A gear holding chuck as in claim 1 in which the plurality of pistons as carried by and in the rotating body, each piston having a transverse pin moved by the piston with each transverse pin engaging a compatible hole formed in the collet and moving said collet by said transverse pins.

9. A gear holding chuck as in claim 1 in which the plurality of pistons are each carried in a stepped bore formed in the rotating body and the enlarged end of each bore is closed by and with a removable plug and the piston on its head carries an O-ring providing a seal and on its shank the piston is slidably sealed by another O-ring.

10. A gear holding chuck as in claim 9 in which each piston head is formed with a groove carrying an O-ring and the shank of said piston is slidably sealed by another O-ring carried in a groove formed in the body, each piston head formed with a step to provide a pressurized area at the head end of the piston and at the rear of the head end there is formed a step which is larger than the shank and provides a pressurized area at the rear of the head of the piston.

11. A gear holding chuck as in claim 1 in which the hydraulic fluid fed to each side of the piston head is isolated and with said flow selectively fed to the piston, said flow isolated by O-rings disposed between the fixed outer housing and rotatable body.

12. A gear holding chuck as in claim 11 in which there is an additional inlet into the outer housing by and through which oil mist is fed to the shank end portion of the pistons.

13. A gear holding chuck as in claim 11 in which each inlet also includes a circumferentially disposed distributing groove at and with each inlet conduit.

14. A gear holding chuck as in claim 1 in which each segment is formed with a slot sufficient for selective arcuate positioning and repositioning to a selected position whereat the segment is secured by cap screws whose shank portions pass through this slot.

15. A gear holding chuck as in claim 1 in which the means for adjustably positioning the pin in a segment holder is an adjusting wedge having a ramp slope adapted to mate with a conical end formed on the gear gripping pin, this adjusting wedge selectively moved and movable by screw means associated with the segment.

16. A method for holding gears with and by a fixture with the gears having their teeth profiles finished or substantially finished, this method including gripping like-formed and finished gears by and on their teeth profiles while the bore of this held gear is finished, said method of forming said fixture including:

(a) providing a fixed outer housing and forming a plurality of hydraulic conductors leading from the exterior of the housing to an interior bore formed in said housing;

(b) rotatably mounting a body carried interior of the fixed outer housing and forming the interior portion of this body with a conical bore in axial alignment with the bore of the housing;

(c) carrying said body in and by bearing means disposed between the fixed outer housing and the rotatable body, said bearing means adapted to carry the rotatable body in a selected and determined orientation;

(d) sealing the bearing means to protect the bearing means from unwanted exterior contamination such as dirt, dust and the like;

(e) carrying a collet in and by the rotatable body and forming said collet with a tapered outer surface compatible with the conical bore formed in the rotatable body, said axial movement of the collet within the conical bore of the body producing an in and out movement of the collet corresponding to the axial movement of the tapered outer surface of the collet in the conical bore of the rotatable body;

(f) providing in each end said collet with a plurality of tapped holes arranged in arcuate groups and arranging and mounting a plurality of segments as pairs and securing in a selected position said segments as pairs, each segment secured to an opposite end of the collet in selected tapped holes and carrying a tooth engaging pin in each segment so as to be selectively movable with the in and out movement of the collet;

(g) adjustably positioning each engaging pin in the segment holder to precisely bring the engaging pin to a desired gripping position in the tooth of a gear when and while the collet is moved and brough to its inner limit;

(h) rotating the rotatable body and associated components and the gripped gear so as to permit the machine finishing of the bore of the gear;

(i) providing an adjustable stop means comprising an arm having a threaded portion adjustably movable in said arm and arranging and positioning said adjustable stop which is secured to and carried at one end of the collet in a selected tapped hole so as to engage a gear at a selected shoulder so the gripped gear is positioned in the chuck at the same selected location, and (j) carrying a plurality of pistons in the rotating body and moving said pistons by hydraulic means so as to move the collet axially to cause inward and outward movement of the gripping pins to established limits of movement, this hydraulic fluid being fed through the conductors in the housing.

17. A method for holding gears on their teeth profiles as in claim 16 which further includes the step of securing a timing belt pulley on the rotatable body and rotating said body by an engaged timing belt and motive means.

18. A method for holding gears on their teeth profiles as in claim 16 which further includes carrying the rotatable body by a pair of oppositely disposed tapered roller bearings and mounting said bearings in recesses formed in the outer housing and sealing these bearings from dust and dirt by grease shields carried in formed outer recesses.

19. A method for holding gears on their teeth profiles as in claim 16 which further includeds carrying a plurality of pistons in stepped bores formed in the rotating body and closing the enlarged end of each bore by and with a removable plug and forming each piston head with a groove in which is carried an O-ring providing a seal of this head and enclosing the shank of each piston with an O-ring so as to slidably seal each shank.

20. A method for holding gears on their teeth profiles as in claim 16 which further includes forming the outer housing with an additional inlet through which oil mist is fed to the shank end portion of the piston.

21. A method for holding gears on their teeth profiles as in claim 16 which further includes forming the segments with slots of sufficient length so that the shank portions of cap screws may pass through the slots and into threaded holes formed in an arcuate pattern in each end of the collet.

22. A method for holding gears on their teeth profiles as in claim 16 which further includes forming each tooth gripping pin with a conical end and in a like manner forming each adjusting wedge with a compatible ramp slope and moving each wedge selectively and precisely by a rotatable screw associated with and carried in each segment.

* * * * *